US007347695B2

(12) United States Patent
Ware et al.

(10) Patent No.: US 7,347,695 B2
(45) Date of Patent: Mar. 25, 2008

(54) CHRONIC OBSTRUCTIVE PULMONARY DISEASE SIMULATOR

(76) Inventors: Linda M. Ware, 9225 SW. Summerhurst Rd., Vashon, WA (US) 98070; Raymond G. Martinez, 9225 SW. Summerhurst Rd., Vashon, WA (US) 98070

( * ) Notice: Subject to any disclaimer, the term of this patent is extended or adjusted under 35 U.S.C. 154(b) by 168 days.

(21) Appl. No.: 11/404,434

(22) Filed: Apr. 14, 2006

(65) Prior Publication Data
US 2007/0196780 A1    Aug. 23, 2007

Related U.S. Application Data

(60) Provisional application No. 60/765,146, filed on Feb. 3, 2006.

(51) Int. Cl.
*G09B 23/28* (2006.01)
(52) U.S. Cl. .................................................. 434/262
(58) Field of Classification Search ................ 434/262, 434/265, 267, 275; 602/19, 79; 2/69, 77, 2/102, 113, 114, 115
See application file for complete search history.

(56) References Cited

U.S. PATENT DOCUMENTS

| 4,004,579 | A |   | 1/1977 | Dedo |         |
|-----------|---|---|--------|------|---------|
| 4,531,919 | A | * | 7/1985 | Ware | 434/262 |
| 4,689,030 | A | * | 8/1987 | McWaters | 441/88 |
| 4,838,263 | A |   | 6/1989 | Warwick |      |
| 5,144,694 | A |   | 9/1992 | Daoud |       |
| 5,146,932 | A |   | 9/1992 | McCabe |      |
| 5,429,593 | A | * | 7/1995 | Matory | 602/79 |
| 5,950,238 | A | * | 9/1999 | Klein | 2/69 |
| 5,957,873 | A | * | 9/1999 | Allen | 602/19 |
| 6,036,662 | A |   | 3/2000 | Van Brunt |     |
| 6,585,673 | B1 |   | 7/2003 | Bass |          |
| 6,916,298 | B2 |   | 7/2005 | VanBrunt |     |
| 6,936,021 | B1 | * | 8/2005 | Smith | 602/19 |
| 6,939,315 | B2 |   | 9/2005 | Sherman |      |
| 2005/0080361 | A1 |   | 4/2005 | Escudero |    |
| 2005/0080364 | A1 |   | 4/2005 | Jensen |      |
| 2005/0234372 | A1 |   | 10/2005 | Hansen |     |
| 2006/0019576 | A1 |   | 1/2006 | Bell |          |

FOREIGN PATENT DOCUMENTS

WO    WO 99/56831    11/1999

* cited by examiner

*Primary Examiner*—Kurt Fernstrom
(74) *Attorney, Agent, or Firm*—Barry L. Davison; Davis Wright Tremaine LLP (57) ABSTRACT

Particular aspects provide a garment for simulating chronic obstructive pulmonary disease (COPD), comprising a particularly efficacious combination of a thorax-constricting garment portion, and a diaphragm-impeding garment portion, along with an optional restrictive airway mask. The thorax-constricting portion has a frontal abdominal-thoracic plate member and tensioning means extendible around a wearer's thoracic circumference to provide for constrictive thoracic-abdominal tensioning. The diaphragm-impeding portion has a projection (e.g., weighted projection or pouch) projecting away from the wearer-proximal surface of the frontal plate member, which is operative with the thorax-constricting portion to simultaneously constrict thorax expansion while impeding diaphragm contraction and downward movement. Additional aspects provide a method for simulating COPD, comprising tensioning a thoracic-abdominal constricting garment, having diaphragm-impeding means and optional restrictive airway mask, around a wearer's thoracic-abdominal area at a tension, and for a time period sufficient to simulate at least one symptom or effect of COPD.

37 Claims, 5 Drawing Sheets

CHRONIC OBSTRUCTIVE PULMONARY DISEASE SIMULATOR

CROSS-REFERENCE TO RELATED APPLICATIONS

This application claims the benefit of priority to U.S. Provisional Patent Application Ser. No. 60/765,146, filed Feb. 3, 2006, and incorporated by reference herein in its entirety.

FIELD OF THE INVENTION

Aspects of the invention relate generally to educational garments and devices, and more particularly to educational garments that provide for simulation of one or more symptoms of a disease (e.g., chronic obstructive pulmonary disease (COPD)) by a wearer.

BACKGROUND OF THE INVENTION

COPD. Chronic obstructive pulmonary disease (COPD) generally describes a group of respiratory tract diseases that are characterized by airflow obstruction or limitation. Diseases associated with COPD include bronchitis, emphysema, asthma, and lung cancer. COPD is the fourth leading cause of death and the second leading cause of major disability among the major diseases in the United States. COPD is projected to become the third leading cause of death by 2020. More than 120,000 deaths from COPD occur annually in the U.S., making this the only disease in the top five killers that has a rising death rate (183% increase in the death rate from 1965 to 2002). The U.S. healthcare economy is facing increasing COPD costs. More than 30 billion dollars are expended per year in medical costs, hospitalization, physician office visits, and other indirect costs (e.g., loss of work days and premature mortality), and these costs continue to escalate as the prevalence of COPD continues to rise.

Tobacco use and the pronounced need for effective education deterrence. Tobacco use is the single largest cause of preventable death in the United States. Most smokers experience one or more negative health consequence, ranging from reduced lung function to premature death. Worldwide, smoking causes about five million deaths every year, and is also responsible for 80-90% of COPD cases and associated diseases. Smoking is easily the most critical and correctable risk factor for COPD. Reducing the number of smokers will reduce the number of COPD sufferers and will provide substantial widespread health benefits.

Cessation of smoking can improve hypertension, decrease the risk of cardiovascular disease, reduce suffering from peptic ulcers, and decrease the tendency to develop facial wrinkles. Many people, however, continue to smoke despite being aware of the negative health consequences and the health benefits of quitting. This resistance to cessation is primarily because of the potent addictive properties of tobacco and nicotine, and despite numerous programs and pharmaceutical methods targeted at smoking cessation, tobacco use and addiction remains a formidable health problem.

Therefore, deterring individuals from starting to smoke continues to be an important approach, because more than one million young people begin smoking each year. For many, smoking becomes a lifelong habit, and one in three teens who start smoking today will die from a smoking-related illness. Unfortunately, even the most aggressive anti-smoking advertising and public service announcements have had only a modest effect, and new smokers continue to emerge at an alarming rate. For many potential smokers, simply reading or hearing about a list of adverse physiological changes associated with long-term smoking does not provide adequate insight and understanding to provide for effective deterrence.

There is, therefore, a pronounced need in the art for novel and effective compositions and methods to encourage disease avoidance (e.g., smoking cessation) and/or to provide for adequate education about disease effects (e.g., the effects of smoking) to provide for effective deterrence.

SUMMARY

Particular aspects provide a garment for simulating chronic obstructive pulmonary disease. The inventive garment comprises a unique and highly efficacious combination of a thorax-constricting garment portion, and a diaphragm-impeding garment portion. The thorax-constricting portion has a frontal abdominal-thoracic plate member and tensioning (tightening, constructing) means extendible around a wearer's thoracic-abdominal circumference to provide for application of constrictive thoracic-abdominal tension. The diaphragm-impeding portion has a weighted projection that projects away from the wearer-proximal surface of the frontal abdominal-thoracic plate member, and is operative with the thorax-constricting garment portion to simultaneously constrict expansion of a wearer's thorax and upper abdomen while impeding contraction and downward movement of a wearer's diaphragm and providing additionally work-load for the wearer. In preferred aspects, the frontal abdominal-thoracic plate member is a composite frontal abdominal-thoracic plate member comprising two adjacent frontal subplates having adjacent inner edges separated by reversible joining means (e.g., zipper, snaps, pin(s), hooks, buttons, buckles, VELCRO®, ties, clasps, ZIPLOC®, clips, or any suitable multi-component complementary reversible fastener, etc.) so that the garment can be quickly released by a user). In particularly preferred aspects, the garment further comprises supplementary tensioning (tightening, constricting) means extendible across at least a portion of the wearer-distal surface of the composite frontal abdominal-thoracic plate member. In particular aspects, the garment further comprises a restrictive airway mask.

Additional aspects provide a method for simulating chronic obstructive pulmonary disease, comprising tensioning a thoracic-abdominal constricting garment around a wearer's thoracic-abdominal area at a tension, and for a time period sufficient to simulate at least one symptom or effect of chronic obstructive pulmonary disease. The time period for wearing the garment to simulate COPD symptoms will vary somewhat between wearers, and will depend on the extent of tensioning (tightening, constructing) of the garment. Generally, the time period is from about 10 to about 50 minutes, from about 20 to about 45 minutes, from about 25 to about 40 minutes, or from about 30 to about 35 minutes, depending upon the individual, the extent of constrictive tensioning, and whether or not a restrictive airway mask is worn. In preferred aspects, the method is practiced with the garments of the present invention.

DETAILED DESCRIPTION OF THE INVENTION

Aspects of the present invention provide novel compositions and methods, including novel garments and garment systems that provide for effective simulation of one or more symptoms of a disease. The inventive garments not only have substantial educational utility, but also have substantial utility for deterring disease-promoting behaviors by individuals.

Definitions

In the following, the term "abdomen" or "abdominal region" refers generally to the region of a human body between the diaphragm and the pelvis (or between the thoracic cavity and the pelvis) containing a cavity (abdominal cavity) that holds organs such as the pancreas, stomach, intestines, liver, gallbladder, and which is enclosed by the abdominal muscles and the vertebral column (backbone).

The term "torso" generally refers to the central portion of the human body excluding the head and legs.

The term "thorax" refers to the body division found humans and other mammals lying between the neck and abdomen and is also called the chest. The skeletal frame of the thorax is formed by the sternum (breastbone) and ribs in front and the dorsal vertebrae in back. Within the thoracic cavity are the heart, lungs, and esophagus. The chest and abdominal cavities are separated by a muscular structure, the diaphragm.

The term "thoracic vertebrae" refers to the 12 thoracic vertebrae situated between the cervical (neck) vertebrae and the lumbar vertebrae. The thoracic vertebrae are typically represented by the symbols T1 through T12, and provide attachment for the ribs and make up part of the back of the thorax (the chest).

The term "rib cage" refers to the part of the human skeleton within the thoracic area formed by the thoracic vertebrae and ribs, the sternum (breastbone), and the costal cartilages (that attach the ribs to the sternum). The rib cage typically consists of 24 ribs, 12 on each side of the thoracic cavity. The first seven pairs of ribs are connected to the sternum in front and are known as true ribs (costae verae, I-VII). The eighth, ninth, and tenth are attached in front to the catilaginous portion of the next rib above and are known as false ribs (costae spuriae, VIII-X). The lower two, that is the eleventh and twelfth, are not attached in front and are called floating ribs (costae fluitantes, XI-XII). The spaces between the ribs are known as intercostal spaces, and they contain the intercostal muscles, nerves, and arteries. The rib cage allows for breathing due to its elasticity.

The "sternum" (breast bone) refers to the long flat bone in the upper middle of the front of the chest. The sternum articulates (comes together) with the cartilages of the first seven ribs and with the clavicle (collar bone) on either side. The sternum consists of three parts: the manubrium (the upper segment of the sternum, a flattened, roughly triangular bone), the corpus or body of the sternum, and the xiphoid process (the little tail of the sternum than points down). These sections of the sternum arise as separate bones and later they may fuse partially or completely with one another.

COPD Simulator Garment

Preferred aspects provide a garment and garment system that, when worn, effectively simulate one or more physical aspects of chronic obstructive pulmonary disease (COPD)) by a wearer, and thus provide for effective education and deterrence relating to COPD-promoting behaviors. Additional aspects provide a method for simulating COPD, comprising wearing a garment that comprises a thorax-constricting portion and diaphragm-impeding portion for a time sufficient to effectively simulate one or more COPD associated symptoms or physical limitations in the wearer. An optional restrictive airway mask may be worn.

In particular aspects, the inventive garment comprises: a thorax-constricting portion fixable around the thoracic and upper abdominal region of a wearer's torso and suitable to constrict thoracic and upper abdominal expansion; along with at least one diaphragm-impeding portion that sufficiently projects into the upper-abdominal area so as to impede the downward movement of the diaphragm normally associated with contraction thereof, whereby breathing and diaphragm-assisted breathing are impeded to simulate COPD-associated symptoms or physical limitations in the wearer. In particular embodiments, the COPD simulator garment further comprises an optional airway mask that further restricts breathing.

In particular embodiments the thorax-constricting portion comprises a frontal abdominal-thoracic plate member (front plate member) with attached tensioning (tightening, constricting) means to tighten the thorax-constricting portion around the wearer's thoracic and upper abdominal region. In additional embodiments, the thorax-constricting portion further comprises one or more supplementary tensioning (tightening, constricting) means centrally attached to the front plate member to further tighten the front plate member against a wearer.

In operation of the garment, the thorax-constricting portion is positioned around a wearer's thoracic-abdominal region, or a portion thereof, and adjusted by tensioning means to sufficiently constrict expansion of the chest and rib cage so as to impede breathing. Preferably, the thorax-constricting portion is proportioned and operatively positionable to wrap around the torso to cover an area extending from about the mid thoracic region (e.g., from about ribs 4 or 5, or from about the arm-pit level) across the lower thoracic region and across the upper to mid abdominal region (e.g., the thoracic region extending from a position at about the fourth or fifth rib, or from about the arm-pit level, down to about a mid-abdominal position below the ribs, or to about the level of the naval), to provide for constricting the expansion of the implicated thoracic-abdominal region. The garment may be worn differently depending on the build and sex of wearer (e.g., just below the breasts of a woman).

The tensionable thorax-constricting portion comprises a front plate member that is positionable, and preferably conformable over the front aspect of the mid to lower thoracic region and lower to mid abdominal region (e.g., to cover the lower chest and upper abdomen). In particular aspects, the front plate member is generally planer having front (operatively distal to a wearer) and back (operatively proximal or adjacent to a wearer) surfaces. The front plate can be of any suitable shape (e.g., a generally planer shape) (e.g., circular, ovoid, rectangular, square, diamond, etc.). Preferably, the front plate member, while being generally planer is conformable, at least to some extent, to a wearer. In particular aspects, the front plate is generally rectangular or square, and comprises upper, lower, left and right edges. In preferred aspects, the front plate includes at least one attached 'stay' (e.g., vertical 'stay') (e.g., strip of relatively rigid metal, plastic, etc.) member that spans the height and/or width of the front plate, or a portion thereof, and thereby serves to maintain the shape (e.g., planar shape) of the front plate. Preferably, such stays are covered by a suitable material (e.g., soft pile covered) and sewn into or onto the front plate, or may be integral therewith. Preferably, at least two such stays (e.g., vertical stays) are used, one along the left and right edge of the front plate. In preferred aspects, the front plate member is comprised of two equivalent, adjacent sub-plates, joined by a reversible joining means (e.g., safety-release zipper) to provide for a composite front plate that is operatively separable (e.g., by a wearer of the garment) into the two sub-plates. Preferably, the composite front plate is generally rectangular or square, and comprises upper, lower, left and right edges. In preferred aspects, the composite front plate includes at least one attached vertical 'stay' (e.g., strip of relatively rigid metal, plastic, etc.) member that spans the height, or portion thereof, of the composite front plate and thereby serves to maintain the planar shape of the composite front plate. Preferably, such stays are covered by a suitable material (e.g., soft pile covered) and sewn into or onto the composite front plate, or may be integral therewith. Preferably, at least two such vertical stays are used, one along the left and right edges of the front plate. Even more preferably, at least four such vertical stays are used, one along each vertical edge of the two front sub-plates, with a reversible joining means (e.g., safety-release zipper) located between the two inner stays.

The front plate or composite front plate member can comprise, or be of any suitable material (e.g., fabric, plastic, leather, metal, etc.). Preferably, the material, while providing for a conformable plate-like structure, is non-elastic or substantially non-elastic, and has sufficient strength and rigidity to support adequate constrictive tensioning in the operative context of the overall garment, but is nonetheless sufficiently pliant or flexible so as to conform, at least to some extent, with a wearer's front torso contour to provide for uniform circumferential tensioning (tightening, constricting) around the thoracic-abdominal region. In preferred aspects, a leather plate or composite plate member is used. A cushioning or 'backing' material (e.g., foam, cloth, etc.) may be optionally applied on the back side of the plate or sub-plate material. The front plate or front composite plate may be of any depth or thickness sufficient, in view of the nature of the materials used, to provide for a conforming structure (e.g., plate-like) having sufficient strength and rigidity to support adequate constrictive tensioning in the operative context of the overall garment. Preferably, the plate is about 1 to about 5 mm, about 1 to about 3 mm, about 1 to about 2 mm, or about 2 to about 3 mm thick, although thicker plates or composite plates may be used. In particular aspects, the front plate is generally square or rectangular having dimensions of about 38 cm (15 inches) wide to about 25.4 cm (10 inches) high, about 35.6 cm (14 inches) wide to about 28 cm (11 inches) high, about 33 cm (13 inches) wide to about 30.4 cm (12 inches) high, about 33 cm (13 inches) wide to about 33 cm (13 inches) high, about 30.4 cm (12 inches) wide to about 35.6 cm (14 inches) high. Preferably, the front plate is generally square or rectangular having dimensions of about 33 cm (13 inches) wide to about 28 cm (11 inches) high, or about 34.3 cm (13.5 inches) wide to about 30.4 cm (12 inches) high.

Any suitable tensioning (tightening, constricting) means may be used including but not limited to: straps; cords; bands, belts; straps and/or cords and/or bands and/or belts, combined with reversible fastening or joining means (e.g., buckles (e.g., side-release buckles), clips, buttons, snaps, hooks, loops, ties, belt type fasteners, etc.), inflatable or pneumatic tensioning means, ratcheting means, hydraulic means, cinches and the like. Preferably, the tensioning means comprises a stretchable, elastic element. The tensioning means may further comprise assistive tensioning means, such as pulleys, loops (e.g. metal loops), block and tackle means (or the equivalent thereof), or the like, through which straps, cords, belts, etc., and the like pass to change the direction or point of application of a force applied to the straps, cords, belt, etc., to assist in tensioning the garment. In particular embodiments, the tensioning means comprises at least one tightening strap or band, at least one respective assistive tensioning loop, and at least one respective suitable fastening means (e.g., side-release buckles having female and male buckle portions).

In particular embodiments, and with respect to each of the one or more straps or bands, a female side-release buckle portion is attached to or articulated with one (either left or right) edge of the front plate or composite front plate, and an assistive loop (e.g., rectangular metal loop (e.g., about 1.9 cm×8.3 cm (about ¾ inches by 3¼ inches)) is attached to or articulated with the opposing side of the plate. Preferably, the female side-release buckle portion and the metal loop are indirectly attached to their respective front plate edges by means of intervening flexible elastic strap sections (e.g., sections of about 7.6 cm to about 10.1 cm (about 3 to about 4 inches) long) that are attached (e.g., sewn into) to the respective front plate edges. The male side-release buckle portion is attached to a first end of the at least one strap or band, and the second strap or band end is passed through the respective metal loop to provide for a change in the direction or point of application of a force applied to the strap or belt to assist in tensioning (tightening, constricting) the garment. In particular embodiments the second strap or band end, after passing through the metal loop, is attachable to the strap or band by second-end attachment means. Preferably, the strap or band comprises double-sided soft pile VELCRO®, and the second-end attachment means comprises a double-sided hook VELCRO® 'floater'. In this way, the garment can be secured around the implicated thorax/abdominal portion of a wearer by engaging the male and female buckle portions, and, after passing the second-end of at least one tightening strap or band through the respective metal loop(s), cinching up the strap or band by applying force to the at least one second-end, followed by engaging of the second-end attachment means. Preferably, the tensioning means is designed and proportioned such that the engaged buckle portions are positionable generally on the side or back aspect of the garment (e.g., on a wearer's side or back) and application of force to cinch up the strap or band is from the back side of the wearer. Preferably, a plurality of straps or bands (e.g., double-sided soft pile VELCRO®) are used, in combination with a respective plurality of assistive tensioning loops (e.g., metal loops), a respective plurality of suitable fastening means (e.g., side-release buckles having female and male buckle portions), a respective plurality of second-end attachment means (e.g., double-sided hook VELCRO® 'floaters'), and a respective plurality of intervening elastic elements. Preferably, from two to five, from two to four, or from three to four tightening straps or bands are used, along with respective assistive loops, buckle portions, second-end attachment means, and intervening elastic elements. Preferably, four tightening straps or bands are used, along with respective assistive loops, buckle portions, second-end attachment means, and intervening elastic elements.

The exemplary strap or band can be of any suitable material (e.g., leather, string, cloth, synthetic material (e.g., plastic, nylon, etc.), metal (e.g., chain)), and can be, for example, continuous or in the form of a mesh, webbing, or cable, etc. Preferably, the material, while providing for a tightenable strap or band-like structure, is non-elastic or substantially non-elastic, has sufficient strength and rigidity to support adequate constrictive tensioning in the operative context of the overall garment, and is nonetheless sufficiently pliant or flexible so as to conform around a wearer's body contour to provide for uniform constrictive tensioning around the implicated thoracic and abdominal regions. In preferred aspects, a plurality of double-sided soft pile VELCRO® straps or bands are used. The at least one tightening strap or band may be of any width and of any depth or thickness sufficient, in view of the nature of the materials used, to provide for a conformable strap or band structure having sufficient strength to support adequate constrictive tensioning in the operative context of the overall garment. Preferably, the at least one tightening strap or band has a width of about 2.5 cm to about 10 cm, about 2.5 cm to about 7.5 cm, about 2.5 cm to about 5 cm, or about 7 cm to about 8 cm, although other widths may be used. Preferably, the at least one strap or band is about 1 mm to about 5 mm, about 1 mm to about 3 mm, about 1 mm to about 2 mm, or about 2 mm to about 3 mm thick, although other greater or lesser thicknesses may be used. The at least one strap or band is of a length sufficient to allow for tightening around a wearer's torso. In preferred aspects the at least one strap or band is about 102 cm (about 40 inches) long, but as will be appreciated in the art, can be appropriate sized, depending upon the typical wearer's dimensions.

As stated above, the inventive garments and garment systems have at least one diaphragm-impeding portion that sufficiently projects laterally and into the upper-abdominal area below the diaphragm (e.g., at an abdominal position corresponding to the central area between about the eighth, ninth or tenth ribs) so as to impede the downward movement of the diaphragm normally associated with contraction thereof. Preferably, the diaphragm-impeding portion is proportioned to cover a sufficient distance laterally along both sides of the abdominal centerline just below the diaphragm, such that the inward projection of the diaphragm-impeding portion sufficiently impedes diaphragm contraction to impede diaphragm-assisted expansion of both lungs. The diaphragm-impeding portion may be comprised of a single appropriately proportioned portion. Alternatively, the diaphragm-impeding portion may comprise two or more portions that are positioned bilaterally with respect to the abdominal centerline just below the thoracic cavity. In particular embodiments, the diaphragm-impeding portion is integral with the thorax-constricting portion of the garment. Alternatively, the diaphragm-impeding portion(s) is separate, or separate and attachable and positionable (e.g., by means of VELCRO@) upon the inner surface of the front plate member (or inner surfaces of the composite front plate member) so as to provide for effective bilateral impedance of diaphragm assisted breathing by the wearer.

In particular embodiments the diaphragm-impeding portion comprises a deformable, but non-compressible, or substantially non-compressible structure (e.g., a pouch or sac-like structure), such that it operationally conforms to a wearer's body contour, but nonetheless provides a sufficient volume (e.g., non-compressible volume) for inward projection to provide for effective bilateral impedance of diaphragm assisted breathing by the wearer. In preferred embodiments, the diaphragm-impeding portion comprises two weighted pouches containing non-compressible spheres or pellets (e.g., such as steel shot, bismuth shot, copper-plated shot, lead shot, etc.), each pouch forming a roughly cylindrical shape having a length of about 10.2 cm (about 4 inches) and a diameter of about 6.4 cm (about 2.5 inches). In preferred embodiments, a strip of soft pile VELCRO® material is attached (e.g., sewn) to the lower two-thirds of the inner surfaces of two front sub-plates of a composite plate, and the pouches, each with an attached strip of hook VELCRO®, are adjustably attached to the inner surfaces the sub-plates. Preferably, the diaphragm-impeding portion (e.g., pouches) attached to the inner surfaces of the sub-plates are appropriately positioned (e.g., along the soft pile VELCRO® strip) to cover a sufficient distance laterally along both sides of the abdominal centerline just below the diaphram, such that, in operation of the garment, the inward projection of the diaphragm-impeding portion sufficiently impedes diaphragm contraction to impede diaphragm-assisted expansion. In particular embodiments, the pouches are weighted with spheres or pellets as described above. Preferably, the pouches each have a weight of about 0.9 Kg (2 lbs), about 1.4 Kg (3 lbs), about 1.8 Kg (4 lbs), about 2.3 Kg (5 lbs), about 3.4 Kg (7.5 lbs), or about 4.5 Kg (10 lbs). Preferably, each pouch weighs about 2.3 Kg (about 5 lbs).

In preferred embodiments, an optional supplemental tightening or tensioning means provides for additional tightening of the garment, and particularly tightening or tensioning of the front plate member against the wearer. The supplemental tightening means may, for example, comprise V-shaped segments of elastomeric material attached to the left and right edges of the frontal plate member or composite frontal plate member, and which are elastically extendible around the sides of the implicated torso region towards the back of the wearer. In preferred embodiments, the supplemental tightening means is a continuous elastomeric band, having two identical 'open' ends and one 'pointed' intermediate section where the band is overlapped and sewn together to form a 'V' shape. The two 'open' ends are centrally attached (or substantially centrally attached) to the frontal plate member (e.g., on either side of the reversible joining means, or in the case of a composite frontal plate member, to the inner stays or to the material covering the inner stays), and the pointed intermediate section is laterally stretchable around the torso and attachable to the previously tensioned straps or bands of the thorax-constricting portion by means of a suitable closure material. For example, to aid in fastening of the supplemental tightening means, the supplemental tightening means may comprise a hook or loop means (e.g., VELCRO®) to aid in securing the stretched supplemental tightening means to the previously tensioned straps or bands of the thorax-constricting portion. In operation, therefore, the stretched and secured supplementary tightening means provide for increased tension or compressive force across the front plate portion of the thorax-constricting portion. As will be appreciated by those of ordinary skill in the relevant art, in view of the present teachings, a variety of shapes and configurations of supplementary tightening means could be employed for this purpose and are therefore encompassed herein.

In particular embodiments, the COPD simulator garment further comprises an optional airway mask that further restricts breathing. In preferred embodiments, the restrictive mask comprises a chamber suitable to cover both mouth and nasal openings, the chamber being compressible against, and conformable with the contours of a wearer's face, the chamber additionally comprising one or a plurality of air input openings of sufficient size to allow for restricted breathing, and comprising one-way venting means (e.g., side vents having a plurality of holes covered on one side of the mask by a flap to provide for exhaling through the vent, while precluding inhaling) to allow for release (e.g., restricted release) of exhaled breath. Preferably, the optional mask is worn by a wearer, in combination with the inventive garment to provide an inventive garment system to simulate COPD-associated symptoms or physical effects.

The inventive COPD simulator garment and garment system, provide a wearer with physical sensations that mimic the effects of COPD. Used on a voluntary basis, the inventive garment and garment system safely enable a wearer to physically experience the typical COPD-associated strenuous, labored and shallow (upper-chest) breathing, as well as the associated fatigue, irritability and emotional distress that inevitably results from the feeling of not getting enough air. The COPD simulator garment and garment system also measurably reduce the wearer's total lung volume capacity, as evidenced, for example, by 'before and after' measurements of Peak Expiratory Flow (PEF) rate. Such PEF rates may be measure, for example, by an art-recognized, easy to use Peak Flow Meter. According to aspects of the present invention, such an experience substantially impacts a wearer by confronting the wearer with a realistic 'sneak preview' of the eventual debilitating effects of, for example, smoking, which is the primary cause of COPD.

Some COPD symptoms that may be experienced by the wearer of the inventive COPD simulator garment and garment system include but are not limited to the following: shallow, upper chest breathing; strenuous, labored or difficult breathing; shortness of breath (dyspnea) while at rest and increased upon mild exertion (e.g., by standing, pacing, climbing stairs, etc.); breathlessness or feeling of 'not being able to get enough air'; fatigue and reduction of normal activity level; feelings of irritability, anxiety and/or emotional distress; wheezing; a reduction in peak expiratory flow rate; and combinations thereof.

The inventive COPD simulator garment, or garment system (garment plus mask) may be worn by both males and females and may provide teachers and medical professionals with a 'hands-on' approach to educate and deter adolescents from beginning smoking, and to help current smokers gain an emotional 'gut-level' appreciation for the symptoms and effects of COPD. Additionally, in many instances, wearing the inventive garment may motivate a smoker to see a physician for simple spirometry testing of their current lung function, and to learn about what practical changes they can make to preserve their remaining lung health.

According to particular aspects, the thorax constricting portion is worn with sufficient constrictive tension to greatly reduce the normal upward and outward expansion of the rib cage, thereby reducing lung volume capacity. Likewise, the thorax constricting portion impedes the normal contraction of the intercostal muscles of the wearer's chest, thereby preventing the normal decrease in air pressure which is required for air to be drawn into the lungs. The resulting reduction in a wearer's total lung volume capacity may be confirmed by measuring, for example, a 50 to 200 L/min decline in 'before and after' PEF rate (e.g., measured by a hand-held Peak Flow Meter).

In combination with a diaphragm-impeding portion (as described herein, e.g., comprising positionable inwardly projecting weighted pouches), the thorax-constricting portion significantly impedes the normal downward, contracting movement of a wearer's diaphragm, and thereby prevents deep abdominal level breathing. The resulting shallow, 'upper chest breathing only' is further accentuated by the inhibition of normal diaphragmatic movement due to direct, inward compression and partial displacement of abdominal organs (e.g., stomach, colon, small intestines) by the inwardly projecting diaphragm-impeding portion as describe herein (e.g., by inwardly projecting weighted pouches).

Breathlessness or a feeling of 'not being able to get enough air' results, at least in part, from the inventive garment's stringent torso binding which simulates the effect of damaged air sacs (alveoli) as occurs in emphysema, where the damage leads to reduced surface area of the alveoli sacs, causing a progressive and debilitating decline in the normal exchange of blood gases (i.e., the intake of oxygen upon sufficient inhale, followed by exhale of carbon monoxide that has been absorbed from the blood returning to the lungs).

In particular embodiments, an optional restricted airway mask may be used in combination with the inventive garment to provide for a garment system. The mask forces the wearer to more laboriously inhale through, for example, small openings in the mask. The resulting reduction in the ability to inhale simulates narrowed airways (bronchi and bronchioles), particularly as occurs in chronic bronchitis and asthma, due to inflammation, thickened muscle layers, and excess mucous buildup typical in damaged airways. This shortness of breath in turn causes much of the wheezing, fatigue, irritability and emotional distress characteristic of moderate to severe COPD.

The inventive garments and garment systems have substantial utility in a variety of applications including, but not limited to educational, counseling, and use by medical professionals for motivating smoking prevention and smoking cessation by their students or patients. Such professionals include, but are not limited to: health and Family Life teachers in all Junior and Senior High Schools, colleges, universities, and vocational technical schools; family practice physicians and nurses (who usually are the first to encounter and diagnose symptoms of COPD in a patient); respiratory therapists; cardiologists, and pulmonary specialists; instructors of private or hospital based classes for smoking cessation; the rapidly increasing number of employers who (as per recent changes in the laws of many states in the U.S.) are instituting totally smoke-free work environments, and who wish to assist employees in successfully adapting to this often difficult change; and instructors in medical and nursing education.

Particular Exemplary Embodiments

Particular embodiments provide a garment for simulating chronic obstructive pulmonary disease, comprising: a thorax-constricting garment portion having a frontal abdominal-thoracic plate member with wearer-proximal and wearer-distal surfaces, the thorax-constricting portion further having tensioning means operatively extendible around a wearer's thoracic circumference, or a portion thereof, and operatively articulatable with the frontal abdominal-thoracic plate member to provide for application of constrictive thoracic tension; a diaphragm-impeding garment portion projecting away from the wearer-proximal surface of the frontal abdominal-thoracic plate member, and operative with the thorax-constricting garment portion to simultaneously constrict expansion of a wearer's thorax while impeding contraction and downward movement of a wearer's diaphragm.

In particular aspects, the frontal abdominal-thoracic plate member is a composite frontal abdominal-thoracic plate member comprising two adjacent frontal sub-plates having adjacent inner edges separated by reversible joining means (e.g., zipper, snaps, pin(s), hooks, buttons, buckles, VELCRO®, ties, clasps, ZIPLOC®, clips, or any suitable multi-component complementary reversible fastener). In particular embodiments, the composite frontal abdominal-thoracic plate member further comprises upper, lower, right and left edges positionable on a frontal surface of a wearer, and the tensioning means is operatively articulatable with the left and right composite frontal abdominal-thoracic plate member edges. In certain aspects, the composite frontal abdominal-thoracic plate member further comprises at least one stay member suitable to enhance the rigidity of the composite frontal abdominal-thoracic plate member or to a portion thereof. Preferably, the composite frontal abdominal-thoracic plate member comprises vertical stays members along the left, right and adjacent inner edges.

In certain preferred aspects, the simulation garment further comprises supplementary tensioning means operatively extendible across the wearer-distal surface of the composite frontal abdominal-thoracic plate member, or across a portion thereof. Preferably, the supplementary tensioning means comprises a pair of supplementary tensioning members extending from a position at or near the adjacent inner edges of the frontal sub-plates and extendible in opposite directions bilaterally along the wearer-distal sub-plate surfaces, wherein the supplementary tensioning members are operatively articulatable between the frontal sub-plates and the thorax constricting portion. In particular embodiments, the tensioning means, or a portion thereof, comprises an elastomeric portion or member.

Preferably, the tensioning means comprises at least one tensioning strap. In certain embodiments, that the at least one tensioning strap comprises first and second tensioning strap portions, each having frontal plate-proximal ends that articulate with opposite sides of the frontal plate, and each having frontal plate-distal ends joinable to each other by reversible joining means. In certain aspects, the reversible joining means comprises first and second complementary attachment portions (e.g., female and male portions of a side-release buckle) attached to respective frontal plate-distal strap portion ends. Preferably, at least one of the first and a second tensioning strap portions, comprises an assistive tensioning means to assist in tensioning the garment. In particular aspects, the assistive tensioning means comprises a pivot element (e.g., pulley, loop, and block and tackle means, etc.) through which a portion of the tensioning strap portion passes to change the direction or point of application of a force applied thereto during tensioning of the garment. In particular embodiments, the at least one tensioning strap portion is adjustably attachable to itself by secondary attachment means (e.g., a planar portion or 'floater' having surfaces that are adjustably attachable between adjacent surfaces of the tensioning strap (e.g., VELCRO® floater) after passing through the pivot element to provide for securing the tensioning strap. In preferred aspects, the at least one strap portion comprises a frontal plate-proximal strap sub-portion that articulates between the frontal plate and the assistive tensioning means, and a frontal plate-distal strap sub-portion that articulates between the assistive tensioning means and the frontal plate-distal end of the at least one strap portion.

In particular aspects, the supplementary tensioning means, or a portion thereof, comprises an elastomeric portion or member. Preferably, the supplementary tensioning members comprise strap members. In particular embodiments, each supplementary tensioning strap member comprises a strap having two ends attached along the inner edge of the respective sub-plate. Preferably, the strap comprises a v-shaped strap with ends attached at different vertical positions along the inner edge of the respective sub-plate.

In particular aspects, the projecting diaphragm-impeding garment portion is integral with the frontal abdominal-thoracic plate member. Alternatively, the projecting diaphragm-impeding garment portion is separate, or adjustably attachable to the wearer-proximal surface of the frontal abdominal-thoracic plate member to provide for suitable positioning of the diaphragm-impeding garment portion. In preferred embodiments, the projecting diaphragm-impeding portion comprises two separate projecting sub-portions, each adjustably attachable to the wearer-proximal surface of one of the adjacent frontal sub-plates. Preferably, each of the separate projecting sub-portions is proportioned to operatively project into a wearer a distance of about 3 to about 7 cm, about 3 to about 6 cm, or about 4 to about 5 cm. Preferably, each separate projecting sub-portion comprises a weighted pouch, for example, containing a plurality of rigid spheres or pellets to provide for a projection that is, at least to some extent, operatively conformable to a wearer. In particular aspects, the rigid spheres or pellets are selected from the group consisting of steel shot, bismuth shot, lead shot, copper-plated steel, bismuth or lead shot, and combinations thereof, and where each separate projecting sub-portion forms a roughly cylindrical but conformable shape have a length of about 8 to about 12 cm, about 9 to about 11 cm, or about 10 cm, and a diameter of about 3 to about 7 cm, about 3 to about 6 cm, or about 4 to about 5 cm. Preferably, each separate projecting sub-portion has a weight of about 0.9 Kg (2 lbs), about 1.4 Kg (3 lbs), about 1.8 Kg (4 lbs), about 2.3 Kg (5 lbs), about 3.4 Kg (7.5 lbs), or about 4.5 Kg (10 lbs). Preferably, each pouch weighs about 2.3 Kg (about 5 lbs). Most preferably, each separate projecting sub-portion has a weight of about 2.3 Kg (about 5 lbs).

In certain aspects, the simulation garment further comprises a restrictive airway mask.

Additional embodiments provide a method for simulating chronic obstructive pulmonary disease, comprising: tensioning a thoracic-abdominal constricting simulation garment around a wearer's thoracic-abdominal area at a tension, and for a time period sufficient to simulate at least one symptom or effect of chronic obstructive pulmonary disease, where the constricting simulation garment comprises a thorax-constricting garment portion, and a diaphragm-impeding garment portion. Additional aspects further comprise fitting the wearer with a restrictive airway mask during at least part of said time period. Preferably, the time period is from about 10 to about 50 minutes, from about 20 to about 45 minutes, from about 25 to about 40 minutes, or from about 30 to about 35 minutes.

In preferred embodiments, the method is practiced using a constricting simulation garment comprising: a thorax-constricting garment portion having a frontal abdominal-thoracic plate member with wearer-proximal and wearer-distal surfaces, the thorax-constricting portion further having tensioning means operatively extendible around a wearer's thoracic-abdominal circumference, or a portion thereof, and operatively articulatable with the frontal abdominal-thoracic plate member to provide for application of constrictive thoracic tension; and a diaphragm-impeding garment portion projecting away from the wearer-proximal surface of the frontal abdominal-thoracic plate member, and operative with the thorax-constricting garment portion to simultaneously constrict expansion of a wearer's thorax while impeding contraction and downward movement of a wearer's diaphragm. Particular aspects further comprise fitting the wearer with a restrictive airway mask during at least part of said time period. Preferably, the time period is from about 10 to about 50 minutes, from about 20 to about 45 minutes, from about 25 to about 40 minutes, or from about 30 to about 35 minutes.

Aspects of the invention may be further understood by reference to the attached drawings with reference numbers identifying respective elements. Generally, identical reference numbers are used between and among the drawings to identify identical or equivalent elements.

Figure 1:
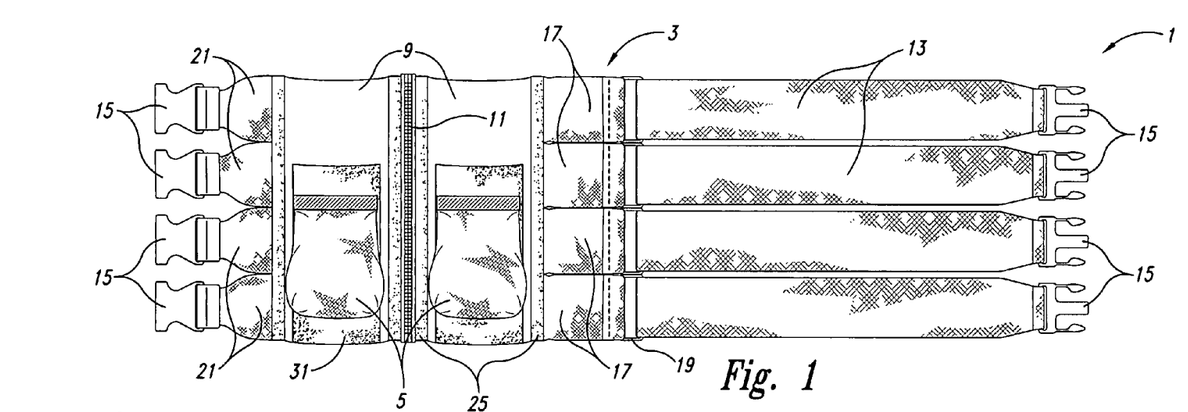
FIG. 1 shows, according to particular aspects of the present invention, a view of the wearer-proximal surfaces of an exemplary embodiment of a garment for simulating the symptoms or effects of chronic obstructive pulmonary disease (COPD) by a wearer thereof.
Figure 2:
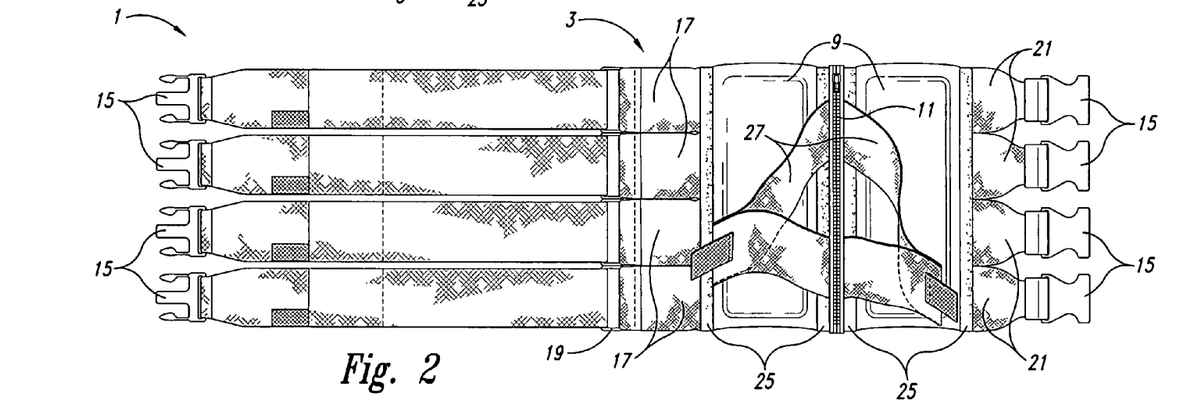
FIG. 2 shows a view of the wearer-distal surfaces of the exemplary COPD simulating embodiment of FIG. 1, which includes supplementary tensioning means that passes over the frontal abdominal-thoracic plate member.
Figure 3A:
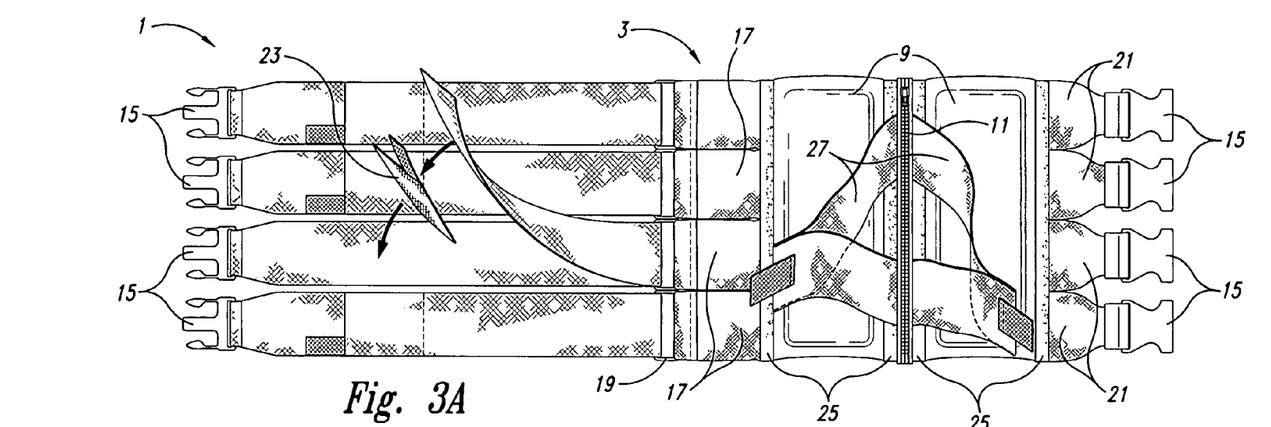
FIGS. 3A and 3B show the exemplary embodiment of FIGS. 1 and 2, and further illustrate the use and placement of a double-sided 'floater' in attaching the tensioning means (e.g., straps) for adjusting the garment.
Figure 3B:
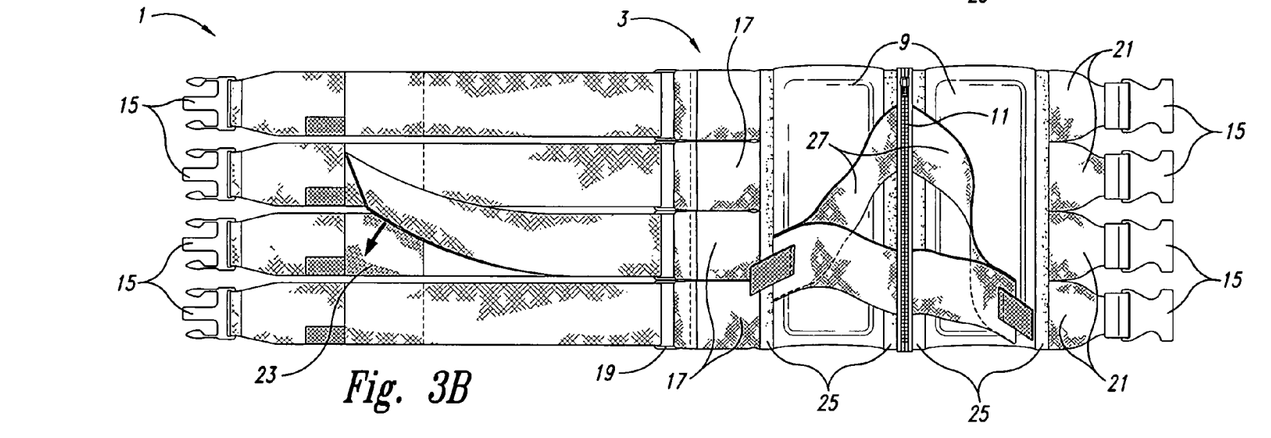

FIGS. 1-3 show an exemplary embodiment of the inventive garment. The main body portion of the garment comprises a thorax-constricting portion 3. The thorax-constricting portion 3 comprises a generally planar front plate member 9 having front (distal to wearer) and back (proximal to wearer) surfaces, and having upper, lower, left and right edges. In particular embodiments, the front plate member 9 is a composite front plate member comprising two adjacent front sub-plate portions joined at the center by reversible joining means (e.g., by a safety release mechanism, such as a zipper) 11 between the inner edges of the sub-pates, and a plurality of tightening or tensioning straps or bands 13 attached (e.g., indirectly, intervening elastic elements 21 and 17) to at least one outer front plate edge, and that are used, for example, in combination with fastening means 15 (e.g., buckles, side-release buckles, etc.) to fasten or cinch the garment around the implicated torso potion of the wearer. In particular embodiments, the safety release mechanism 11 comprises a zipper. Alternatively, snaps, releasable pull tabs, pins, or another type of releasable material and/or mechanism, provide the wearer with an option to release the garment quickly without requiring prior release of the tightening bands 13, which, in particular embodiments, are not readily accessible to the wearer for release. The frontal plate member 9 is generally proportioned to be centerable on the front region of the wearer from about the mid thoracic region to and including part of the abdomen.

The tightening bands 13 extend laterally from one or more sides of the frontal member may be joined on the back of the wearer by means of releasable connectors (fastening means) 15, such as side release clips or buckles. Each releasable connector 15 may, for example, have a male component and a female component. The tightening bands 13 may comprise an elongated strap-like element made from or surface-coated with a closure material, such as one component of a hook and loop-type material. Each tightening band 13 may be attached directly to the frontal plate member, or, alternatively, by an intervening elastic element 17. A tightening band 13 may be threaded through an assistive loop or tension loop 19, which provides a means to tighten the thorax-constricting member around the implicated torso region of the wearer. The tension loop 19 may be metal or plastic. The ends of the tightening bands 13 opposite to where they are attached to the frontal plate member 9 may be attached to either a male or female component of a releasable connector 15.

The complementary portion (male or female) of the releasable connector component 15 is located on the opposite (relative to the tensioning strap or band) side of the frontal member 9, and may be joined to the frontal member by means of an intervening elastic element 21 that my be tapered. The tightening band 13 is threaded through the respective tension loop 19 and attached to itself by means of, for example a VELCRO® "floater" 23 that may comprise a segment of dual-sided closure material that is complementary to the closure material of the respective tightening band 13. For example, if the tightening band is made of "hook" type material, then the floater 23 may comprise complementary "loop" type material on both sides. Stays 25 (e.g., relatively rigid) may be used to add structural rigidity to the frontal member 9, and to aid in operative compression of the implicated torso region.

While FIGS. 1-3 show a thorax-constricting portion 3 having four tightening bands 13, any number of tightening bands, or equivalent elements, are encompassed within the scope of the present invention. Having a plurality of tightening bands enables the garment to be custom fitted on wearers with varying body sizes and shapes. For female wearers, the upper edge of the front plate member of the thorax-constricting member 3 would generally be placed just below the breasts to avoid unwanted compression of mammary tissue. For male wearers, the thorax-constricting member 3 may be placed slightly higher and may cover slightly more of the thoracic region.

Therefore, in particular embodiments, and with respect to each of the one or more straps or bands, a female side-release buckle portion 15 is attached to one (either left or right) edge of the front plate or composite front plate, and an assistive loop 19 (e.g., rectangular metal loop (e.g., about 1.9 cm×8.3 cm (about ¾ inches by 3¼ inches)) is attached to the opposing side of the plate. Preferably, the female side-release buckle portion and the metal loop are indirectly attached to their respective front plate edges by means of intervening flexible elastic strap sections (21 and 17, respectively) (e.g., sections of about 7.6 cm to about 10.1 cm (about 3 to about 4 inches) long) that are attached (e.g., sewn into) to the respective front plate edges. The male side-release buckle portion is attached to a first end of the at least one strap or band, and the second strap or band end is passed through the respective metal loop 19 to provide for a change in the direction or point of application of a force applied to the strap or belt to assist in tensioning the garment. In particular embodiments the second strap or band end, after passing through the metal loop, is attachable to the strap or band by second-end attachment means. Preferably, the strap or band comprises double-sided soft pile VELCRO®, and the second-end attachment means comprises a double-sided hook VELCRO® 'floater' 23. In this way, the garment can be secured around the implicated thorax/abdominal portion of a wearer by engaging the male and female buckle portions, and, after passing the second-end of at least one tightening strap or band through the respective metal loop(s), cinching up the strap or band by applying force to the at least one second-end, followed by engaging of the second-end attachment means. Preferably, the tensioning means is designed and proportioned such that the engaged buckle portions are positionable generally on the side or back aspect of the garment (e.g., on a wearer's side or back) and application of force to cinch up the strap or band is from the back side of the wearer. Preferably, a plurality of straps or bands (e.g., double-sided soft pile VELCRO®) are used, in combination with a respective plurality of assistive tensioning loops (e.g., metal loops), a respective plurality of suitable fastening means (e.g., side-release buckles having female and male buckle portions), a respective plurality of second-end attachment means (e.g., double-sided hook VELCRO® 'floaters'), and a respective plurality of intervening elastic elements. Preferably, from two to five, from two to four, or from three to four tightening straps or bands are used, along with respective assistive loops, buckle portions, second-end attachment means, and intervening elastic elements. Preferably, four tightening straps or bands are used, along with respective assistive loops, buckle portions, second-end attachment means, and intervening elastic elements.

The exemplary strap or band can be of any suitable material (e.g., leather, string, cloth, synthetic material (e.g., plastic, nylon, etc.), metal (e.g., chain)), and can be continuous or in the form of a mesh, webbing, or cable, etc. Preferably, the material, while providing for a tightenable strap or band-like structure, is non-elastic or substantially non-elastic, and has sufficient strength and rigidity to support adequate constrictive tensioning in the operative context of the overall garment, is nonetheless sufficiently pliant or flexible so as to conform around a wearer's body contour to provide for uniform constrictive tensioning around the implicated thoracic and abdominal regions. In preferred aspects, a plurality of double-sided soft pile VELCRO® straps or bands are used. The at least one tightening strap or band may be of any width and of any depth or thickness sufficient, in view of the nature of the materials used, to provide for a conformable strap or band structure having sufficient strength to support adequate constrictive tensioning in the operative context of the overall garment. Preferably, the at least one tightening strap or band has a width of about 2.5 cm to about 10 cm, about 2.5 cm to about 7.5 cm, about 2.5 cm to about 5 cm, or about 7 cm to about 8 cm, although other widths may be used. Preferably, the at least one strap or band is about 1 mm to about 5 mm, about 1 mm to about 3 mm, about 1 mm to about 2 mm, or about 2 mm to about 3 mm thick, although other greater or lesser thicknesses may be used. The at least one strap or band is of a length sufficient to allow for tightening around a wearer's torso. In preferred aspects the at least one strap or band is about 102 cm (about 40 inches) long, but as will be appreciated in the art, can be appropriate sized, depending upon the typical wearer's dimensions.

In preferred embodiments, an optional supplemental tightening or tensioning means 27, provides for additional tightening of the garment, and particularly tightening or tensioning of the front plate member, on the wearer. The supplemental tightening means 27 may, for example, comprise V-shaped segments of elastomeric material attached to the left and right edges of the frontal plate member, and which are elastically extendible laterally around the sides of the implicated torso regions towards the back of the wearer. In preferred embodiments of the invention, the supplemental tightening means 27 is a continuous 'V' shaped elastomeric band, having two identical 'open' ends and one 'pointed' intermediate section where the band is overlapped and sewn together. The two 'open ends are centrally attached to the frontal plate member 9, and the pointed intermediate section is stretchable around the torso and attachable to the previously tensioned straps or bands of the thorax-constricting portion 3 by means of a suitable closure material. For example, to aid in fastening of the supplemental tightening means, the supplemental tightening means 27 may comprise a hook or loop means to aid in securing the stretched supplemental tightening 27 means to the previously tensioned straps or bands of the thorax-constricting portion 3. In operation, therefore, the stretched and secured supplementary tightening means provide for increased tension across the front plate portion of the thorax-constricting portion 3. As will be appreciated by those of ordinary skill in the relevant art, in view of the present teachings, a variety of shapes and configurations of supplementary tightening means could be employed for this purpose and are therefore encompassed herein.

The inventive garments and garment systems have at least one diaphragm-impeding portion that sufficiently projects laterally and into the upper-abdominal area below the diaphragm (e.g., at an abdominal position corresponding to the central between about the eighth, ninth or tenth ribs) so as to impede the downward movement of the diaphragm normally associated with contraction thereof. For example, one or more weighted pouches 5 or other conformable elements comprising non-compressible, weighted material may be positioned on the inside of the frontal plate member 9 to project inwards toward the wearer's mid to upper front abdominal area. Weighted pouches 5, may, for example, weigh from about 1.4 Kg (3 lbs) to about 11.4 Kg (25 pounds), and may be attached to the inner surface of the frontal plate member 9 (e.g., on the side of the frontal plate member proximate to the wearer). The inner surface of the front plate member 9 (or the inner surfaces of the composite front sub-plates) may have segments (e.g., strips) of closure material 31 to which the diaphragm-impeding portion (e.g., weighted pouches 5, comprising a complementary closure material) may be affixed. Preferably, the segment of closure material 31 on the inner surface of the frontal plate member 9 is suitably proportioned and sized to permit adjustable positioning of the inwardly projecting diaphragm-impeding portion (e.g., the weighted pouches 5) to provide inwardly projecting, compressive force in the abdominal region just below the diaphragm. While the drawings provided herein describe a garment with two separate weighted pouches 5, an inwardly projecting diaphragm-impeding portion comprising one or more projecting elements (e.g., weighted pouches 5) is encompassed within the scope of the present invention.

Therefore, In particular embodiments the diaphragm-impeding portion comprises a deformable, but non-compressible, or substantially non-compressible structure (e.g., a pouch or sac-like structure), such that it operationally conforms to a wearer's body contour, but nonetheless provides a sufficient non-compressible volume for inward projection to provide for effective bilateral impedance of diaphragm assisted breathing by the wearer. In preferred embodiments, the diaphragm-impeding portion comprises two weighted pouches containing non-compressible spheres or pellets (e.g., such as steel shot, bismuth shot, copper-plated shot, lead shot, etc.), each pouch forming a roughly cylindrical shape having a length of about 10.2 cm (about 4 inches) and a diameter of about 6.4 cm (about 2.5 inches). In preferred embodiments, a strip of soft pile VELCRO® material is attached (e.g., sewn) to the lower two-thirds of the inner surfaces of two front sub-plates of a composite plate, and the pouches, each with an attached strip of hook VELCRO®, are adjustably attached to the inner surfaces the sub-plates. Preferably, the diaphragm-impeding portion (e.g., pouches) attached to the inner surfaces of the sub-plates are appropriately positioned (e.g., along the soft pile VELCRO® strip) to cover a sufficient distance laterally along both sides of the abdominal centerline just below the diaphram, such that, in operation of the garment, the inward projection of the diaphragm-impeding portion sufficiently impedes diaphragm contraction to impede diaphragm-assisted expansion. In particular embodiments, the pouches are weighted with spheres or pellets as described above. Preferably, the pouches each have a weight of about 0.9 Kg (2 lbs), about 1.4 Kg (3 lbs), about 1.8 Kg (4 lbs), about 2.3 Kg (5 lbs), about 3.4 Kg (7.5 lbs), or about 4.5 Kg (10 lbs). Preferably, each pouch weighs about 2.3 Kg (about 5 lbs).

Figure 4:
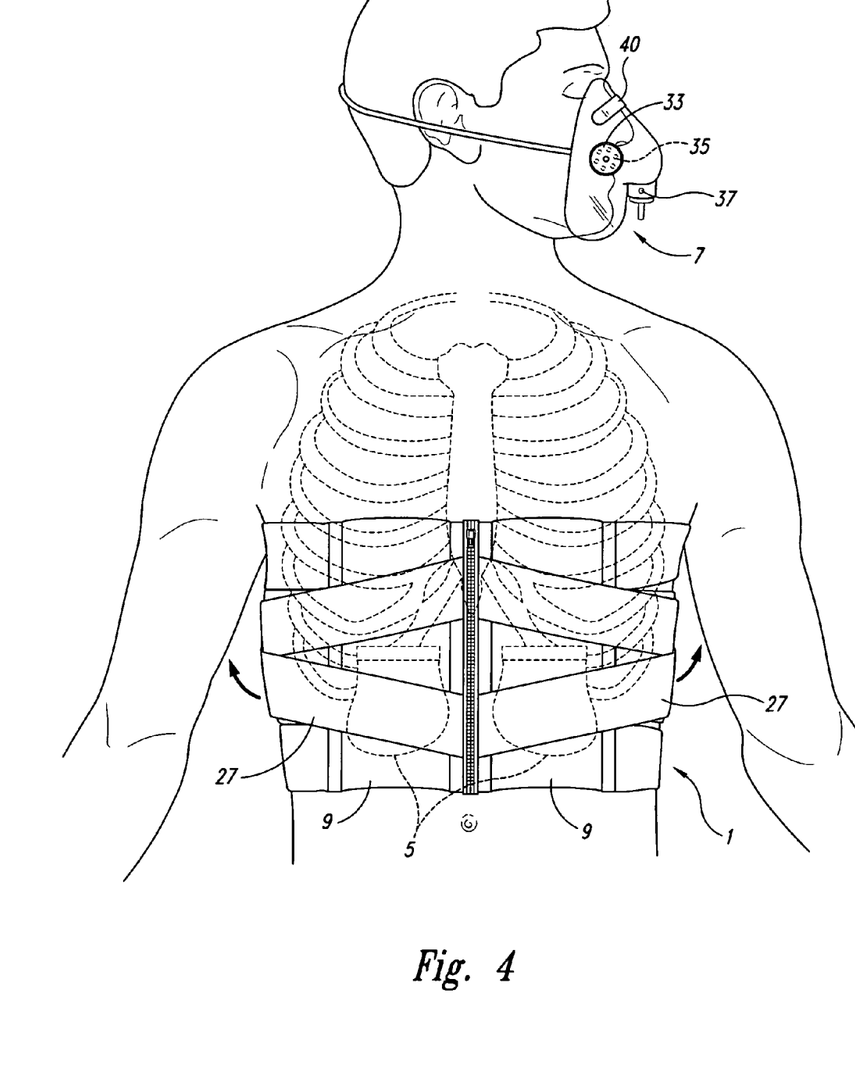
FIGS. 4 and 5 show, in perspective views, the exemplary embodiment of FIGS. 1, 2 and 3 as worn by, and tensioned around a wearer of the COPD simulating garment. Diaphragm-impeding portions (shown in dashed lines) are positioned and proportioned so as to project into the upper abdominal area below the diaphragm, and are operative with a thorax-constricting garment portion to simultaneously constrict expansion of a wearer's thoracic-abdominal area while impeding diaphragm contraction and downward movement. An optional restrictive airway mask is also shown.
Figure 5:
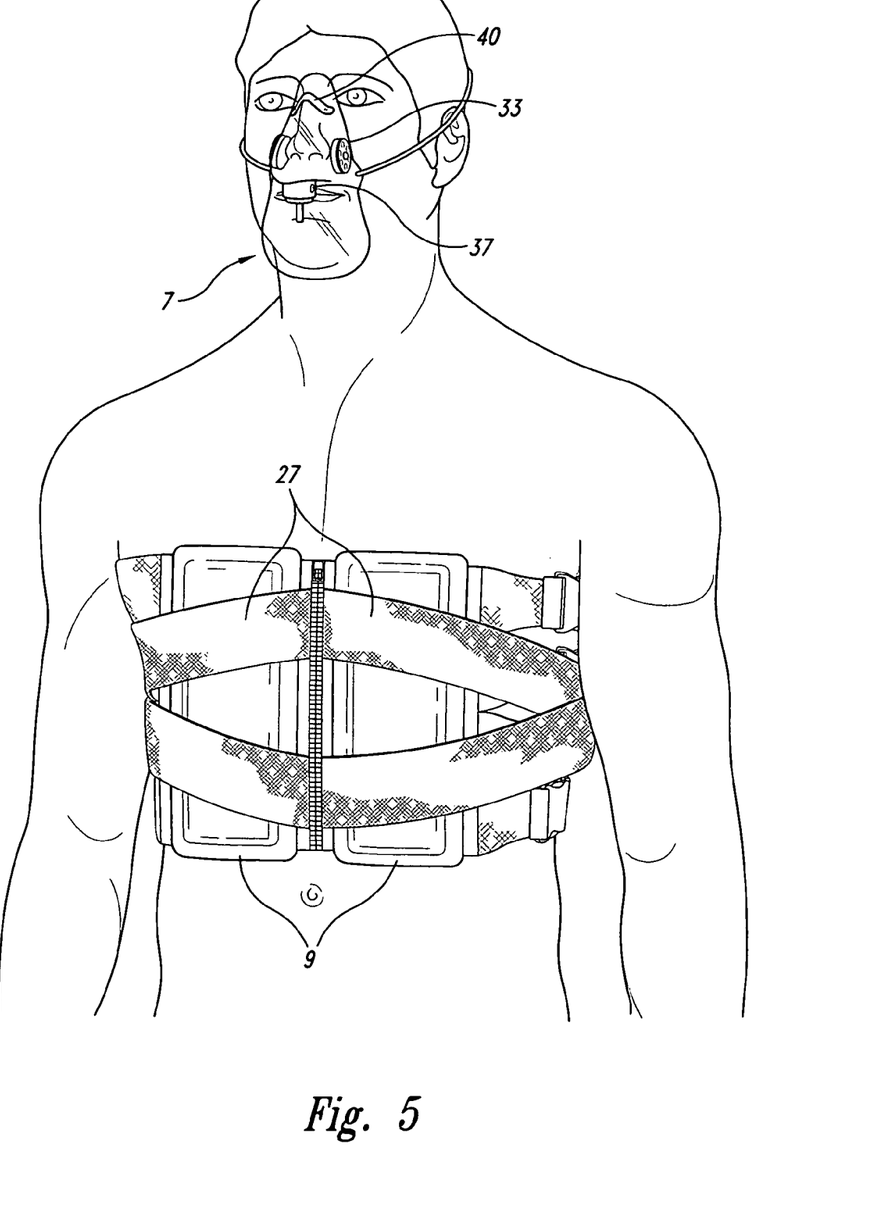
Figure 6:
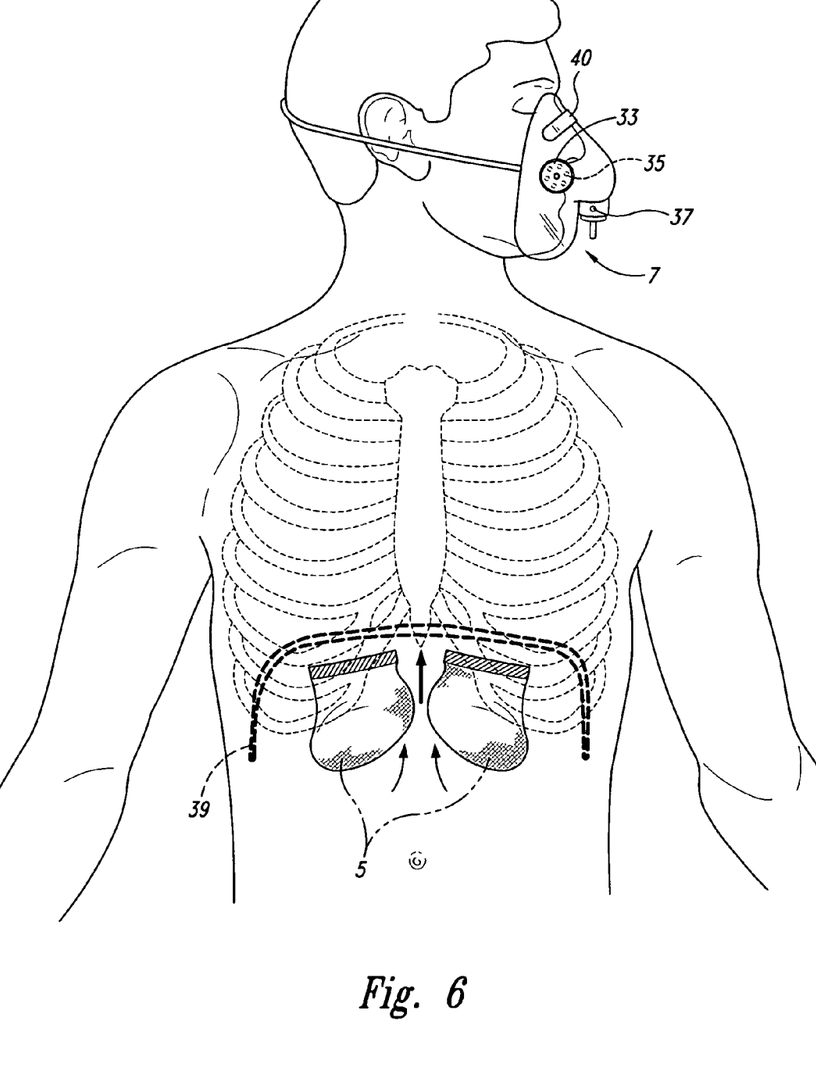
FIG. 6 shows, for further illustrative purposes in relation to FIGS. 4 and 5, the position of the diaphragm-impeding portions (shown in dashed lines), which are positioned and proportioned so as to project into the upper abdominal area below the diaphragm to impede contraction and downward movement thereof.

In certain embodiments of the invention, a garment system is provided, comprising the above-described thorax-constricting portion, the above-described diaphragm-impeding portion, and further comprising a restrictive air mask 7.

In particular embodiments, the restrictive airway mask 7 has a chamber that covers a wearer's mouth and nasal openings, the mask having a frontal nosepiece with a perforated cylindrical protrusion extending therefrom. The exemplary chamber comprises at lease one, one-way exhalation valve (e.g., two, circular, soft vinyl flaps 33 that cover two, circular, five-hole air vents 35) located on either or both sides of the mask 7. The flaps 33 permit a wearer's air to be exhaled, but preclude inhalation there through. Rather, air must be restrictively inhaled through relatively small openings 37 around the perimeter of the mask 7 where it conforms with the nose, cheeks and chin of the wearer, or through one or more (e.g., three), very small openings in the hard plastic, cylindrical protrusion extending from the mask's nosepiece.

Therefore, In particular embodiments, the COPD simulator garment also comprises an optional airway mask 7 that further restricts breathing. In preferred embodiments the restrictive mask comprises a chamber suitable to cover both mouth and nasal openings, the chamber being compressible against, and conformable with the contours of a wearer's face, the chamber additionally comprising a frontal nose piece with one or a plurality of air input openings of sufficient size to allow for restricted breathing, and the chamber comprising one-way venting means to allow for release (e.g., restricted release) of exhaled breath. Preferably, the optional mask is worn by a wearer, in combination with the inventive garment to provide an inventive garment system to simulate COPD-associated symptoms or physical effects.

Prior to fastening the inventive garment or garment system on a wearer, the Peak Expiratory Flow (PEF) rate (PEV) of the wearer may be measured. To fasten the COPD simulator garment on a wearer, a person fastening the garment may first place the thorax-constricting portion 3 around the torso of the wearer and join the releasable connectors 15. The tightening bands 13 are then adjusted to apply an initial mount of tensioning of the garment, and the tightening bands are fixed by means of the floaters 23. The releasable connectors 15 are then released to temporarily remove the garment and determine where the inwardly projecting diaphragm-impeding portion (e.g., weighted pouches 5) should be placed to exert an inwardly projecting compressive force just below the diaphragm. The inwardly projecting diaphragm-impeding portion (e.g., weighted pouches 5) is then attached to the inner surface of the frontal plate member of the thorax-constricting portion constrictor with closure material. The releasable connector portions 15 are then rejoined in the closed position. The tightening bands 13 are then be tightened by pulling the band ends through the tension loops 19 and affixing them to the tightening bands using the floaters 23. Supplemental tightening means 27 may then be applied to produce further constriction across the frontal plate member. After a sufficient time period (e.g., from about 15 to about 30 minutes) of wearing the garment, a second PEV measurement may be taken to determine if the wearer's capacity to breathe freely has been sufficiently diminished.

If desired, the airway mask 7 may be applied in combination with the inventive garment to provide a garment system to further restrict breathing. In particular method embodiments, the wearer of the COPD simulator may be instructed to stand, pace, or climb stairs throughout a wearing period (e.g., fifteen to thirty minutes of wearing the device). This mild exertion, in addition to carrying weight of the weighted pouches 5, increases the wearer's workload and demand for more oxygen at a time when there is a significant decrease in the amount of oxygen available to the wearer, thus effectively mimicking COPD symptoms.

The inventive COPD simulator garments and garment systems may be provided in various sizes to accommodate wearers of various shapes and sizes. However, various sized and shaped inwardly projecting diaphragm-impeding portion (e.g., weighted pouches) may be used with a single sized garment, by means of adjustable positioning of the inwardly projecting diaphragm-impeding portion or portions. Additionally the weight of the inwardly projecting diaphragm-impeding portion may be adjusted. For example, 4.5 Kg (10-pound) weighted pouches 5 may be employed in a medium or large sized garment, while 2.3 Kg (5-pound) weighted pouches 5 may be employed in a smaller-sized garment.

Therefore, particular embodiments provide a method for simulating COPD, comprising wearing a garment or garment system (e.g., as described herein) that comprises a thorax-constricting portion and diaphragm-impeding portion for a time sufficient to effectively simulate one or more COPD associated symptoms or physical limitations in the wearer. In preferred embodiments, the inventive garment or garment system is worn for a time period of about 15 to about 30 minutes, and the Peak Expiratory Flow (PEF) rate (PEV) of the wearer is optionally measured before application of the garment, and at the end of the wearing period to provide for a comparative reading. Preferably, the tensioning of the garment and the garment wearing period is sufficient to provide for a decline in the PEF rate by an amount in the range of about 50 to about 200 L/min period, whereby one or more COPD associated symptoms or physical limitations is simulated in the wearer.

Additional embodiments provide a COPD simulator kit, comprising:

at least one COPD simulator garment (e.g., two complete COPD simulators; such as one sized to fit very small to medium individuals, and one sized to fit medium to very large individuals), comprising a thorax-constricting portion, and at least one diaphragm-impeding portion (e.g., one to two weighted pouches).

The COPD simulator kit may additionally comprise at least one of the following:

at least one restrictive air mask (e.g., fifty custom-made, disposable Airway Restriction Masks);

a Peak Flow Meter (e.g., a mechanical Peak Flow Metter having a 50-800 L/min PEF flow range);

at least one disposable mouthpiece (e.g., fifty disposable mouthpieces, e.g., with 1-way valve to prevent cross contamination during multiple patient use of the above Peak Flow Meter);

patient informational material (e.g.: fifty patient booklets, "The ABC's of Smoking"; fifty patient brochures from the National Lung Health Education Program answering the "Twenty Most Frequently Asked Questions About COPD"; fifty "Informed Consent Release" forms (with copyright permission for unlimited reproduction));

an instructor's manual;

an instructor training videotape (e.g., 30 minutes); and at least one cover-up shirts (e.g., two unisex, "O.R. Scrubs" to cover the simulator's chest constrictor and weighted pouches).

The invention claimed is:

1. A garment for simulating chronic obstructive pulmonary disease, comprising:
    a thorax-constricting garment portion having a frontal abdominal-thoracic plate member with wearer-proximal and wearer-distal surfaces, the thorax-constricting portion further having tensioning means operatively extendible around a wearer's thoracic-abdominal circumference, or a portion thereof, and operatively articulatable with the frontal abdominal-thoracic plate member to provide for application of constrictive thoracic-abdominal tension;
    a diaphragm-impeding garment portion projecting away from the wearer-proximal surface of the frontal abdominal-thoracic plate member, and operative with the thorax-constricting garment portion to simultaneously constrict expansion of a wearer's thorax while impeding contraction and downward movement of a wearer's diaphragm.

2. The simulation garment of claim 1, wherein the frontal abdominal-thoracic plate member is a composite frontal abdominal-thoracic plate member comprising two adjacent frontal sub-plates having adjacent inner edges separated by reversible joining means.

3. The simulation garment of claim 2, wherein the composite frontal abdominal-thoracic plate member further comprises upper, lower, right and left edges positionable on a frontal surface of a wearer, and wherein the tensioning means is operatively articulatable with the left and right composite frontal abdominal-thoracic plate member edges.

4. The simulation garment of claim 3, wherein the composite frontal abdominal-thoracic plate member further comprises at least one stay member suitable to enhance the rigidity of the composite frontal abdominal-thoracic plate member or to a portion thereof.

5. The simulation garment of claim 4, wherein the composite frontal abdominal-thoracic plate member comprises vertical stays members along the left, right and adjacent inner edges.

6. The simulation garment of claim 3, further comprising supplementary tensioning means operatively extendible across the wearer-distal surface of the composite frontal abdominal-thoracic plate member, or across a portion thereof.

7. The simulation garment of claim 6, wherein the supplementary tensioning means comprises a pair of supplementary tensioning members extending from a position at or near the adjacent inner edges of the frontal sub-plates and extendible in opposite directions bilaterally along the wearer-distal sub-plate surfaces, wherein the supplementary tensioning members are operatively articulatable between the frontal sub-plates and the thorax constricting portion.

8. The simulation garment of claim 1, wherein the tensioning means, or a portion thereof, comprises an elastomeric portion or member.

9. The simulation garment of claim 1, wherein the tensioning means comprises at least one tensioning strap.

10. The simulation garment of claim 9, wherein the at least one tensioning strap comprises first and second tensioning strap portions, each having frontal plate-proximal ends that articulate with opposite sides of the frontal plate, and each having frontal plate-distal ends joinable to each other by reversible joining means.

11. The simulation garment of claim 10, wherein the reversible joining means comprises first and second complementary attachment portions attached to respective frontal plate-distal strap portion ends.

12. The simulation garment of claim 11, wherein first and second complementary attachment portions are female and male portions of a side-release buckle.

13. The simulation garment of claim 10, wherein at least one of the first and a second tensioning strap portions, comprises an assistive tensioning means to assist in tensioning the garment.

14. The simulation garment of claim 13, wherein the at least one assistive tensioning means comprises a pivot element through which a portion of the tensioning strap portion passes to change the direction or point of application of a force applied thereto during tensioning of the garment.

15. The simulation garment of claim 14, wherein the pivot element comprises at least one element selected from the group consisting of pulley, loop, and block and tackle means.

16. The simulation garment of claim 14, wherein the at least one tensioning strap portion is adjustably attachable to itself by secondary attachment means after passing through the pivot element to provide for securing the tensioning strap.

17. The simulation garment of claim 16, wherein the secondary attachment means is by use of a planar portion having surfaces that are adjustably attachable between adjacent surfaces of the tensioning strap.

18. The simulation garment of claim 13, wherein the at least one strap portion comprises a frontal plate-proximal strap sub-portion that articulates between the frontal plate and the assistive tensioning means, and a frontal plate-distal strap sub-portion that articulates between the assistive tensioning means and the frontal plate-distal end of the at least one strap portion.

19. The simulation garment of claim 6, wherein the supplementary tensioning means, or a portion thereof, comprises an elastomeric portion or member.

20. The simulation garment of claim 7, wherein the supplementary tensioning members comprise strap members.

21. The simulation garment of claim 18, wherein each supplementary tensioning strap member comprises a strap having two ends attached along the inner edge of the respective sub-plate.

22. The simulation garment of claim 19, wherein the strap comprises a v-shaped strap with ends attached at different vertical positions along the inner edge of the respective sub-plate.

23. The simulation garment of claim 1, wherein the projecting diaphragm-impeding garment portion is integral with the frontal abdominal-thoracic plate member.

24. The simulation garment of claim 1, wherein the projecting diaphragm-impeding garment portion is adjustably attachable to the wearer-proximal surface of the frontal abdominal-thoracic plate member to provide for suitable positioning of the diaphragm-impeding garment portion.

25. The simulation garment of claim 2, wherein the projecting diaphragm-impeding portion comprises two separate projecting sub-portions, each adjustably attachable to the wearer-proximal surface of one of the adjacent frontal sub-plates.

26. The simulation garment of claim 25, wherein each of the separate projecting sub-portions is proportioned to operatively project into a wearer a distance of about 3 to about 7 cm, about 3 to about 6 cm, or about 4 to about 5 cm.

27. The simulation garment of claim 25, wherein each separate projecting sub-portion comprises a weighted pouch containing a plurality of rigid spheres or pellets to provide for a projection that is, at least to some extent operatively conformable to a wearer.

28. The simulation garment of claim 27, wherein the rigid spheres or pellets are selected from the group consisting of steel shot, bismuth shot, lead shot, copper-plated steel, bismuth or lead shot, and combinations thereof, and wherein each separate projecting sub-portion forms a roughly cylindrical but conformable shape have a length of about 8 to about 12 cm, about 9 to about 11 cm, or about 10 cm, and a diameter of about 3 to about 7 cm, about 3 to about 6 cm, or about 4 to about 5 cm.

29. The simulation garment of claim 27, wherein each separate projecting sub-portion has a weight of about 0.9 Kg (2 lbs), about 1.4 Kg (3 lbs), about 1.8 Kg (4 lbs), about 2.3 Kg (5 lbs), about 3.4 Kg (7.5 lbs), or about 4.5 Kg (10 lbs). Preferably, each pouch weighs about 2.3 Kg (about 5 lbs).

30. The simulation garment of claim 27, wherein each separate projecting sub-portion has a weight of about 2.3 Kg (about 5 lbs).

31. The simulation garment of claim 1, further comprising a restrictive airway mask.

32. A method for simulating chronic obstructive pulmonary disease, comprising:
tensioning a thoracic-abdominal constricting simulation garment around a wearer's thoracic-abdominal area at a tension, and for a time period sufficient to simulate at least one symptom or effect of chronic obstructive pulmonary disease, wherein the constricting simulation garment comprises a thorax-constricting garment portion, and a diaphragm-impeding garment portion.

33. The method of claim 32, further comprising fitting the wearer with a restrictive airway mask during at least part of said time period.

34. The method of claim 32, wherein the time period is from about 10 to about 50 minutes, from about 20 to about 45 minutes, from about 25 to about 40 minutes, from about 30 to about 35 minutes, or from about 15 to about 30 minutes.

35. The method of claim 32, wherein the constricting simulation garment comprises:
a thorax-constricting garment portion having a frontal abdominal-thoracic plate member with wearer-proximal and wearer-distal surfaces, the thorax-constricting portion further having tensioning means operatively extendible around a wearer's thoracic circumference, or a portion thereof, and operatively articulatable with the frontal abdominal-thoracic plate member to provide for application of constrictive thoracic tension; and
a diaphragm-impeding garment portion projecting away from the wearer-proximal surface of the frontal abdominal-thoracic plate member, and operative with the thorax-constricting garment portion to simultaneously constrict expansion of a wearer's thorax while impeding contraction and downward movement of a wearer's diaphragm.

36. The method of claim 35, further comprising fitting the wearer with a restrictive airway mask during at least part of said time period.

37. The method of claim 35, wherein the time period is from about 10 to about 50 minutes, from about 20 to about 45 minutes, from about 25 to about 40 minutes, or from about 30 to about 35 minutes.

* * * * *